(12) United States Patent
Rosser et al.

(10) Patent No.: US 7,783,486 B2
(45) Date of Patent: Aug. 24, 2010

(54) RESPONSE GENERATOR FOR MIMICKING HUMAN-COMPUTER NATURAL LANGUAGE CONVERSATION

(76) Inventors: Roy Jonathan Rosser, 56 Maidenhead Rd., Princeton, NJ (US) 08540; Sheldon Braddock Sturges, 37 Palmer Sq., Princeton, NJ (US) 08542

( * ) Notice: Subject to any disclaimer, the term of this patent is extended or adjusted under 35 U.S.C. 154(b) by 526 days.

(21) Appl. No.: 10/536,476

(22) PCT Filed: Nov. 24, 2003

(86) PCT No.: PCT/US03/37721

§ 371 (c)(1),
(2), (4) Date: May 23, 2005

(87) PCT Pub. No.: WO2004/049306

PCT Pub. Date: Jun. 10, 2004

(65) Prior Publication Data

US 2006/0069546 A1    Mar. 30, 2006

Related U.S. Application Data

(60) Provisional application No. 60/428,459, filed on Nov. 22, 2002, provisional application No. 60/459,652, filed on Apr. 2, 2003.

(51) Int. Cl.
*G10L 21/00* (2006.01)
(52) U.S. Cl. .................................. 704/270; 9/270.1
(58) Field of Classification Search .................... 704/9, 704/231, 257, 258, 270, 275
See application file for complete search history.

(56) References Cited

U.S. PATENT DOCUMENTS

| | | | |
|---|---|---|---|
| 5,357,596 A * | 10/1994 | Takebayashi et al. | 704/275 |
| 5,434,777 A | 7/1995 | Luciw | |
| 6,075,550 A | 6/2000 | Lapierre | |
| 6,085,206 A | 7/2000 | Domini et al. | |
| 6,182,028 B1 * | 1/2001 | Karaali et al. | 704/9 |
| 6,275,791 B1 | 8/2001 | Weise | |
| 6,285,999 B1 | 9/2001 | Page | |
| 6,356,909 B1 | 3/2002 | Spencer | |
| 6,430,602 B1 * | 8/2002 | Kay et al. | 709/206 |
| 6,553,345 B1 | 4/2003 | Kuhn et al. | |
| 6,567,805 B1 * | 5/2003 | Johnson et al. | 707/5 |
| 6,615,172 B1 | 9/2003 | Bennett | |
| 6,442,552 B1 | 10/2003 | Sarukkai | |
| 6,721,706 B1 * | 4/2004 | Strubbe et al. | 704/275 |
| 6,973,256 B1 * | 12/2005 | Dagtas | 386/46 |
| 7,058,565 B2 * | 6/2006 | Gusler et al. | 704/7 |

* cited by examiner

*Primary Examiner*—Richemond Dorvil
*Assistant Examiner*—Douglas C Godbold

(57) ABSTRACT

The present invention is an autonomous response engine and method that can more successfully mimic a human conversational exchange. In an exemplary, preferred embodiment of the invention, the response engine has a statement-response database that is autonomously updated, thus enabling a database of significant size to be easily created and maintained with current information. The response engine autonomously generates natural language responses to natural language queries by following one of several conversation strategies, by choosing at least one context element from a context database and by searching the updated statement-response data base for appropriate matches to the queries.

16 Claims, 5 Drawing Sheets

RESPONSE GENERATOR FOR MIMICKING HUMAN-COMPUTER NATURAL LANGUAGE CONVERSATION

CROSS REFERENCE TO RELATED APPLICATIONS

This application is related to, and claims priority from PCT/US2003/037721 application entitled "Autonomous Response engine" filed on Nov. 24, 2003 by Rosser et al., which in turn claims priority from U.S. Provisional Patent application No. 60/428,459 filed on Nov. 22, 2002 by Rosser et al. titled "Automated Tutoring Methods and Systems", U.S. Provisional Patent application No. 60/459,652 filed on Apr. 2, 2003 by Rosser et al. titled "Machine and Apparatus for Machine Participation in Natural Language Discourse", the contents of all of which are hereby incorporated by reference.

FIELD OF THE INVENTION

The present invention relates to the field of autonomous response engines. More specifically, the present invention relates to a method, apparatus, and system for autonomously responding to natural language queries using databases, context elements, conversational strategies and autonomous database updating.

BACKGROUND OF THE INVENTION

In the field of Artificial Intelligence there is significant interest in creating computer programs that successfully mimic human conversational exchanges. Such programs would be of considerable utility as, for instance, interfaces to automated customer service query systems used to respond to routine inquiries. Such programs would also be useful in education, entertainment and marketing by providing automated routine training, as game elements and in automated telemarketing campaigns.

There is such interest in creating programs of this type that there is an annual contest to see which is currently the best. The contest, the Loebner Prize Contest, is based on a definition of thinking proposed in 1950 by Alan Turing, a pioneer in the development of digital computers. Dr. Turning conjectured that if, in a conversational exchange, the responses from a computer were indistinguishable from that of a human, the computer could be said to be thinking. The Loebner Prize Contest subjects computer program to a form of this "Turing Test". Although no program to date has come close to passing the test, significant progress has been made.

To the chagrin of many in the Artificial Intelligence community, the programs that have been most successful in the Loebner Contest, and come closest to imitating a human conversation exchange, do not try to understand human utterances in any meaningful way. Instead the most successful programs operate on a very straight forward principle known as Case Based Reasoning. This consists of simply having a large database of queries and stored responses to those queries. When asked a question, the program looks in its database for a match to that query and, if it finds one, responds with the prepackaged, associated response. By having a large enough database such programs can, under the right circumstances, appear to be responding like a real person. The winner of the 2003 Loebner Contest and currently holder of the title "most human computer program" is a software package called Jabberwock. Jabberwock has a database of about 1.8 million responses to questions. However, even with such a large database of responses the winning Jabberwock was still judged to be "probably a machine", falling well short of passing the Turing Test.

For possible education, game and entertainment applications, what is needed is an improved chatbot, capable of more convincingly imitating participation in a human conversation than existing chatbots.

SUMMARY OF THE INVENTION

The present invention is an autonomous response engine and method that can more successfully mimic a human conversational exchange.

In an exemplary, preferred embodiment of the invention, the response engine has a statement-response database that is autonomously updated, thus enabling a database of significant size to be easily created and maintained with current information. The response engine autonomously generates natural language responses to natural language queries by following one of several conversation strategies, by choosing at least one context element from a context database and by searching the updated statement-response data base for appropriate matches to the queries.

These and other features of the invention will be more fully understood by references to the following drawings.

DETAILED DESCRIPTION

Figure 1:
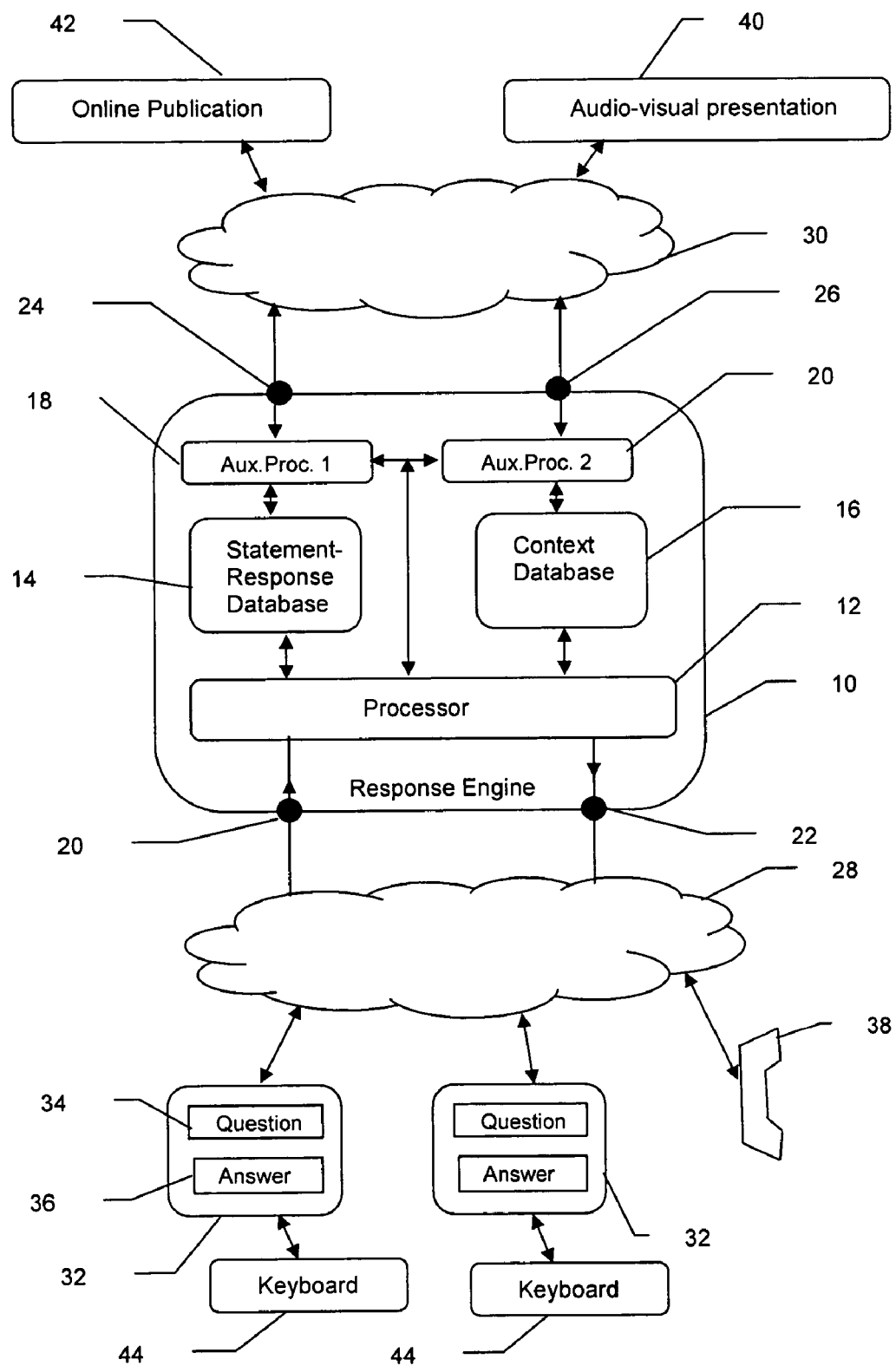
FIG. 1 shows various components of an exemplary autonomous response engine in accordance with the present invention.

The present invention is an autonomous response engine that more successfully mimic a human conversational exchange using a Case Based Reasoning (CBR) strategy based on a statement-response database having of the order of 6 to 10 million statement-response pairs, as well as improved conversation strategies and context elements.

To understand the inventive concepts of the present invention it is useful to briefly review simpler CBR implementations, such as the well known "Chat Bot" technology. "Chat Bot" technology is used, for instance, on the Internet, particularly in text mediated exchanges such as Instant Messaging (IM), as described in, for instance, in U.S. Pat. No. 6,430,602 titled "Method and system for interactively responding to instant messaging requests" issued to Kay, et al. on Aug. 6, 2002, the contents of which are hereby incorporated by reference.

Chat Bot technology typically uses pattern matching techniques to match a query to a database entry and then responds with an answer formulated from that entry. In a simple form, a database will hold query-answer templates as two matching parts.

For instance, a query such as:

"What is the longest river in the world?"

will have a matching answer:

"The longest river in the world is the Nile".

In this way whenever a question is asked that is the same as, or can be simply parsed to be the same as, an existing question in the Bot's database, it will respond with the stored answer. If an existing question cannot be found, the Bot will respond with a pre-defined response, which may depend on the form of the questions, such as:

"I don't know. What do you think it is?"

This form of interaction is termed Case Based Reasoning and simple as it is, can produce Chat Bots that, under certain circumstances, produce conversational responses that appear to mimic human conversational responses. For Chat Bots using Case Based Reasoning, a key determinant of how often and for how long it successfully appear to mimic human conversational responses is the size of the database. A Chat Bot that recently won a public contest has a database of about 1.8 million prepackaged responses.

An adult human, however, is estimated to be able to "deal with" about 60,000 words, in the sense of being able to infer the meaning of the word in context. A good Case Based Reasoning (CBR) database requires, on average, about 100 statement-response pairs per word being "dealt with". This means that an average person may be thought of as having a CBR database of about 6 million statement-response pairs.

What is needed for a computer to successfully mimic a human conversation is a CBR program having a database with about 6-10 million prepackaged responses, as well as ways to leverage that database into a wider range of conversational settings. Current Personal Computers (PC) have the memory and processing power to handle such databases. However, a major obstacle to implementing CBR programs with such large databases is the enormous task of creating the database, and then updating the database so that it keeps pace with changing events, fashions and fads. There is also the related problem of providing such programs with effective conversational strategies, and a better sense of context, to more successfully leverage the large databases in a wider range of conversational settings The autonomous response engine constructed to operate in accordance with the current invention improves on existing Chat Bots by, for instance, providing an automated way to collect and maintain even larger databases of question-answer templates, including databases of the order of 6-10 million statement-response units in size.

Other ways in which a response engine constructed to operate in accordance with the current invention improves on existing technology include having ranked-lists of responses to queries, having more effective conversational strategies and by having context elements that may be responsive to real-world stimuli.

The conversational strategies of the present invention operate to vary the responses chosen from the ranked lists in accordance with criteria such as how long the conversation has been in progress and the sophistication of word usage in the current or previous conversations with the same entity. In addition the response chosen may depend on context elements, which may be related to real-world events such as, but not limited to, weather conditions in a particular location or the outcome of some real-world event or poll. The conversation strategy and real-world context elements combine with the ranked lists of possible responses to leverage a Case Based Reasoning approach and provide varied responses, even to the same query, depending on circumstances in which it is asked, making the conversational interaction appear more human like.

An exemplarily embodiment of an autonomous response engine constructed to operate in accordance with the current invention will now be described by reference to the accompanying drawings, in which like figures describe like elements.

FIG. 1 shows various components of an exemplary autonomous response engine 10 that can be utilized to implement the inventive concepts described herein. The autonomous response engine 10 includes a main processing unit 12, statement-response database 14, a context database 16, a first auxiliary processor 18, a second auxiliary processor, a statement receiving input 20, a response output 22, a first auxiliary communications port 24, a second auxiliary communications port 26. Also shown in FIG. 1 are a first network 28, a second network 30, a communications screen 32, a communications input device 44, a query window 34, a response window 36, an audio communications device 38, an audio-visual presentation station or site 40 and an on-line publication site 42.

The main processing unit 12 may be a standard computer mother board or central processing unit (CPU) and associated drive circuitry, such as, but not limited to, an Intel Pentium® 4 Processor operating at 2.20 GHz and appropriate drive circuitry, having an operating system, such as but not limited to Windows XT on which software packages written in languages such as, but not limited to Sun Inc.'s JAVA, may operate to implement various of the inventive concepts of the present invention. The statement-response database 14 may be an electronic database stored on a standard Personal Computer (PC) hard-drive such as, but not limited to, a Hewlett Packard 40 GB Ultra ATA/100 7200 RPM Hard Drive. The context database 16 may also be an electronic database stored either on the same PC hard-drive as the statement-response database, or a separate, similar hard drive. The first auxiliary processor 18 and second auxiliary processor may simply be subunits of the main processing unit, or may be separate CPUs, either slaved to or operating independently of, but in communication with, the main processing unit 12. Statement receiving input 20 may be any wired or wireless link and any necessary modems connecting the response engine 10 to an input stream of a suitable user interface. Similarly the response output 22 may be any wired or wireless link and any necessary modems connecting the response engine 10 to an output stream of a suitable user interface. First auxiliary communications port 24 and second auxiliary communications port 26 may be any suitable wired or wireless data links and associated modems or other necessary receiving equipment, including, but not limited to radio receiver and television receiver and decoder units, connecting the response engine 10 to a network 30, including being the same data link. First network 28 and second network 30 may be any suitable wired or wireless connection, including but not limited to direct connections, a Local Area Network (LAN), a Wide Area Network (WAN), the Internet, the public telephone network, a wireless telephone network, an analogue or digital cable network or a WiFi wireless network or any combination thereof. Second network 30 may also include a one way communications channel in which content flows to the autonomous response engine 10 such as, but not limited to, a television or radio broadcasting system transmitting content via encoded electromagnetic radiation from either a ground station, a satellite or some other broadcast platform. Communications screen 32 may be any screen on a communications device such as, but not limited to, the screen of a Personal Computer, the screen of a Personal Digital assistant, the screen of a wired or wireless telephone or a television screen. Communications input device 44 may be any suitable device for inputting a natural language query including, but not limited to, a key board or a key pad. Query window 34 may be a suitable graphic window for displaying a query on a communications screen 32, and may be linked to or combined with other graphic or visual elements, including, but not limited to, still or animated cartoons, photographs, video clips or other representations of people, animals, characters or objects. Similarly, response window 36 may be a suitable graphic window for displaying a response on a communications screen 32, and may be linked to or combined with other graphic or visual elements, including, but not limited to, still or animated cartoons, photographs, video clips or other representations of people, animals, characters or objects. An audio communications device 38 may be any suitable audio communications device, such as a telephone, cell phone or other device having at least a microphone for audio input and a speaker for audio output. Audio communications device 38 and communications screen 32 may be on the same device, and for, instance, a response window 36 may be linked to the audio output of communications device 38. Similarly, the query window 34 may linked to the audio input of communications device 38. Audio-visual presentation station or site 40 includes, but is not limited to, an online audio-visual presentation, a television program and a radio program. Online publication site 42 includes websites or computer databases, including, but not limited to, electronic versions of newspapers, periodicals or books as found at, for instance, but not limited to, the New York Times online newspaper site, the project Guttenberg online site or the Lexis-Nexis online database.

Figure 2:
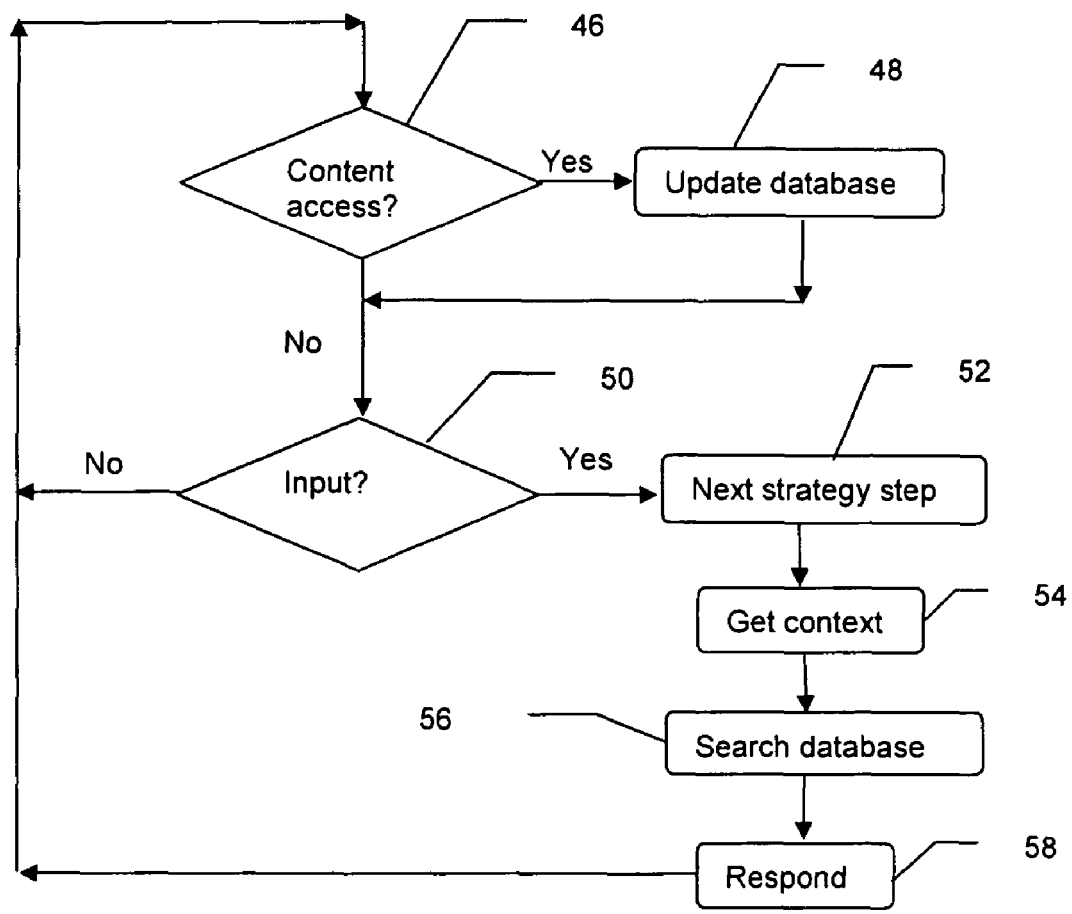
FIG. 2 shows various steps of an autonomous response method in accordance with the present invention.

FIG. 2 shows various steps of an autonomous response method that can be utilized to implement the inventive concepts described herein. The engine 10 determines if it has suitable content access in step 46. If it does, it proceeds to autonomously update a statement-response database in step 48. If not, or if the database is sufficiently up to date, then the autonomous response engine 10 determines if it has received a natural language input in step 50. If such an input has been received, the response engine 10 begins generating a natural language response by following a conversation strategy in step 52 of proceeding with the next strategy step. The engine 10 then proceeds to get context 54. This step confirms or establishes context by choosing at least one context element from a context database. The next step 56 is searching the updated statement response database. The engine 10 then generates a response in step 58.

Automated data gathering from electronic databases is well-known and used by, for instance search engines such as Google, that cache and analyze web pages to provide more effective searching as described in, for instance, U.S. Pat. No. 6,285,999 grated to Page on Sep. 4, 2001, titled "Method for node ranking in a linked database", the contents of which are hereby incorporated by reference.

However, in order to autonomously update a statement-response database to more effectively implement the inventive concepts of the current invention, a novel search strategy, referred to herein as a foveal search strategy is preferably used.

In one embodiment the statement-response database is populated by considering every statement to have a response which is a pattern having a well defined complementary matching key. For instance, in the case of the statement-response being a question-answer complimentary pair, the general question:

What is <subject>?

can be answered by finding a match to the pattern

<subject> is a _____.

where _____ represents the content found. Or more generally, the question can be answered by finding a match to the pattern:

<subject> is [a] _____ [.]

where [a] represents one of a list of definite articles and punctuation marks used in place of definite articles. [a] may for instance be the list:

[a the an said,].

Similarly, [.] represents a list of stop words and punctuation marks used to mark the end of a sentence or phrase. [.] may for instance be the list:

[. ! ? and but].

If [a] is an array having n elements and [.] is an array having m elements, the search requires n*m passes through the material searched. To allow the necessary computation to be done in reasonable time with available processors, the database may be populated and updated using a generalized foveal search, operating to include the following steps:

i. Loop through all sentences looking for <subject> ii. Unpack sentences containing <subject> iii. Loop through creating "Start Pattern" and looking for matches, where "Start Pattern" is <subject> is [a].

iv. On finding a "Start Pattern", loop through looking for "End Pattern" matches.

v. If both a "Start Pattern" and an "End Pattern" are found, what lies between them is the answer to the question. In a general embodiment, where [.] and [a] are lists that can be read in, this results in a code module that can be use to answer other questions. For instance, other questions that may be answered by running the same software module with different lists include, but are not limited to:

What is <subject> <verb>ing?

What is the <adjective> of the <verb>?

With suitable lists these questions can be answered with a simple "Start Pattern", "End Pattern" strategy.

To summarize, a foveal search begins in a standard fashion by first searching for one or more keywords, ignoring all the common or stop words that slows searching. Having found the keyword, acquire the sentence that contains the word. The acquired sentence, and if necessary, the surrounding sentences are then expanded. Expanding includes, but is not limited to, functions such as substituting the related real nouns for pronouns, breaking sentences containing conjunctions into duplicate sentences. Expanding may for instance be done using techniques described in, for instance U.S. Pat. No. 6,275,791 granted to Weise titled "Natural Language Parser", the contents of which are hereby incorporated by reference. Having suitably expanded the sentences surrounding the matched keyword, the sentences are then analyzed, now using everything, including the stop words and punctuation, to see if a question can be answered using a standard question-answer mirror template.

In a preferred embodiment, the database is only undated when unambiguous situations are encountered. This is possible as the autonomous search processes significant amounts of material and can afford to discard unclear or ambiguous situations.

For instance, initially, when searching for a mirror to a "What is <subject>?—i.e. a template of the form "<subject> is a _____." If there is only a single word between "a" and ".", or their acceptable equivalents, then that single word is unambiguously a noun, and if not known, can be added to the list of nouns of interest. If there are multiple words, additional searches can make use of titles, i.e. Mr., Miss, Dr.

etc. to infer that the word or words are proper names. In one embodiment, the autonomous response engine includes a routine that builds on a limited set of known honorifics and learns new ones from them being applied to names already in its database.

In an alternate embodiment, the statement-response database may be updated by a related search strategy termed a matrix search strategy. In the matrix search the first step generate all possible answer patterns and then launch a matrix of those searches in parallel. For instance, an answer to the general question, What is <subject>?

can be found by simultaneously search with the matrix of search strategies that include looking for matches to for instance, the following patterns:

"<subject> is a _____."
"<subject> is the _____."
"<subject> is an _____."
"<subject> is said _____!"
"<subject> is a _____!"
"<subject> is the _____!"
"<subject> is an _____!"
"<subject> is said _____!"

with the matrix of search patterns covering all the possible substitutions for both [a] and [.].

Having autonomously created and updated a statement-response database, the autonomous response engine is ready to receive a natural language query and generate a natural language response. The response may be prepared, in part, by following a conversation strategy. One example of a simple conversation strategy suitable for leveraging the statement-response database is a three stage meeting conversation strategy comprising the steps of:

Negotiating identity;
Negotiating purpose; and,
Negotiating resolution.

Such a simple strategy may be implemented by interpreting each stage as looking for a match to a particular question or type of question. For instance, negotiating an identity may be implemented as seeking a response to the question "Who are you?" and may be posed initially no matter what the input, unless that input already has the right format. So in the initial stages of a conversation, a response my take a form using one of a list of identity negotiation templates, such as, on recognizing the input as a question "Interesting question. But before I respond, I'd like to know a little more about you. Who are you?" If the initial input is not a question, the response may, for instance, be: "Really? But first, let me ask, who are you?" Possible patterns bring looked for include, "My name is *." or "I'm *.".

Once an identity is established by finding such a match, or a predefined number of attempts have been made to establish identity, the strategy may be to move on to attempt to negotiate purpose by posing questions generally of the form "What do you want?" and looking from responses of the form "* want to < >", or "*wanted to < >", or "*don't want *".

Having successfully negotiated a purpose, the response engine may then move on to negotiate resolution by moving on to posing questions in the form or related to "Is that what you wanted?".

Other simple, elements of a conversational strategy may include, for, instance, measuring the length of input, and structuring responses that correspond in length, or measuring the sophistication of the input by some metric such as, but not limited to, the ranking of the words in a ranked frequency list, and formulating a response having a corresponding measure of sophistication by, for instance, using a list of synonyms to substitute more or less sophisticated words into a matching response selected using case based reasoning.

In formulating the response the software package may also take account of a context element chosen from a context database. In the preferred embodiment of the invention that context database may be updated with both local elements, such as time of day, week, month and year, location, including but not limited to location within dwelling or office, as well as external, real-world elements, obtained through autonomous querying of electronic databases, including online databases. These real-world context elements may include elements accessible through online databases such as, but are not limited to, results of events, including sporting and political contests, results of polls or surveys, the status or value of indexes, such as the current or closing price of the well-know DOW or NASDAQ stock indexes, the current or closing value of prices of commodities, foreign exchange rates, mortgage rates, bank loan rates, or current, past or predicted weather conditions in particular locations, including, but not limited to, temperature, precipitation and humidity.

Context elements may also included signs of the zodiac, including the match or mismatch between the time of year and a chosen sign, and the match between a chosen sign and a users declared sign.

The context elements may be used as absolute number or may be used as relative to average, forecast or prior numbers of the same or related context elements.

For instance, a database may have statements with a list of responses which may be ranked by an optimism index consisting of a multiplicative combination of how close the current temperate in NY is to the expected temperature for the day, how much the DOW index rose the day before, and the outcome of the most recent NY Giants Football team or the Yankee baseball team. The database may be populated and updated autonomously via searching of the NY Times online data base, and each response gleaned may include a value for the optimism index. When responding to a query, the autonomous response engine my first query the context database, formulate an optimism index or mood number for today, then select the response to a query as being the one that has an associated optimism index that most closely matches today's optimism index.

Context elements may also be related to the status of a current conversation including, but not limited to, a transpired time of the current conversation, a transpired number of responses already given and the identity of a current enquirer.

The use of a context element may include suitable weighting factors, such as but not limited to, a weighting factor of the form $$\text{Weight}=1/(1+C|Mc-Ml|)$$

where C is a constant, Mc is the current mood number, Ml is the mood number when this response was learnt and | | bracket indicate the absolute difference.

Figure 3:
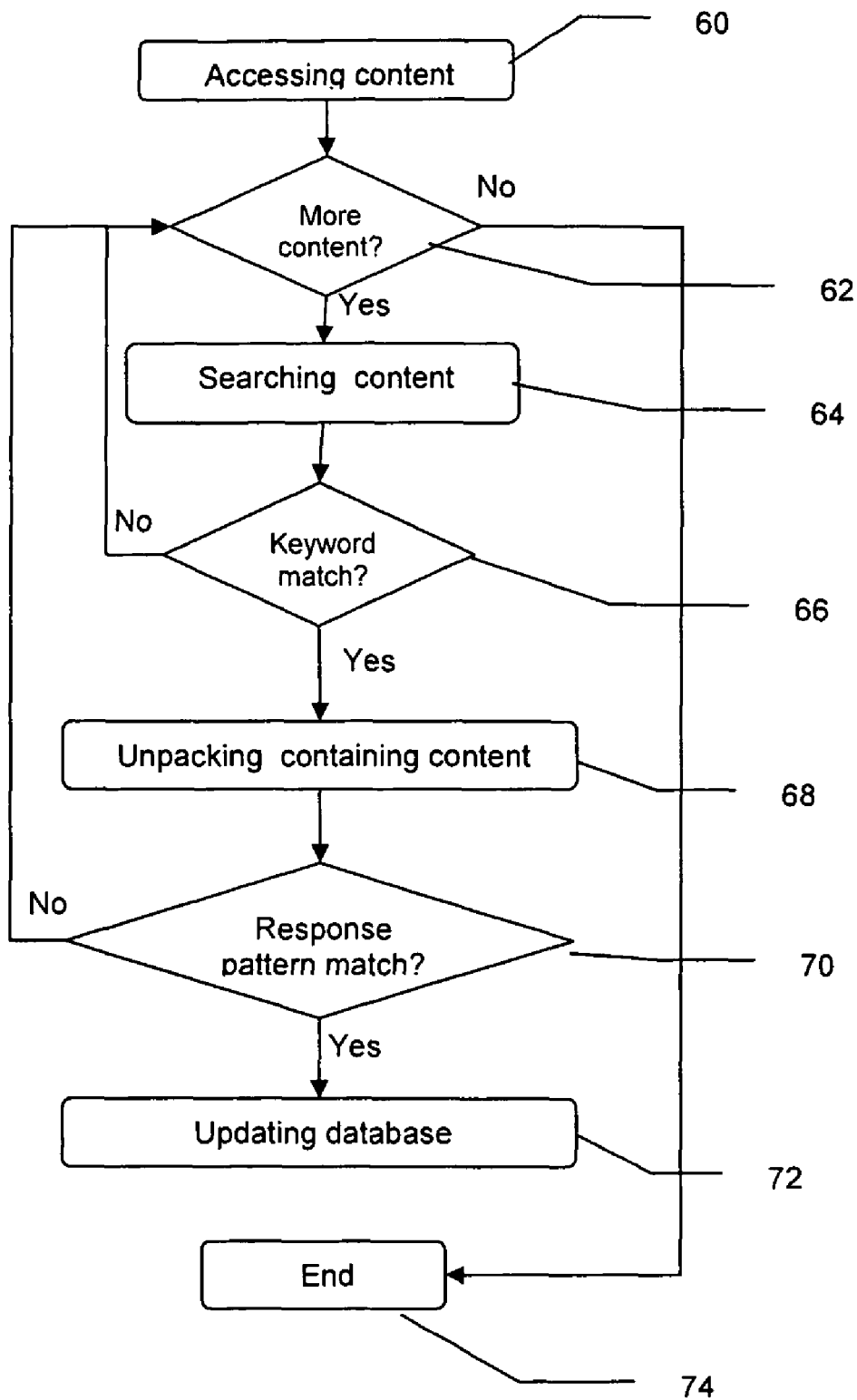
FIG. 3 shows various steps of an exemplarily autonomous search method in accordance with the present invention.

FIG. 3 shows various steps of an exemplarily autonomous search method that can be utilized to implement the inventive concepts described herein. The search method includes the steps of accessing content 60, determining if there is more content 62, searching the content 64, determining if there is a keyword match 66, unpacking the containing content 68, determining if a response pattern matches 70, updating a database 72 and ending the search 74.

In an exemplary embodiment step 60 of accessing content includes locating and loading material from an online publication formatted to be in human readable form such as, but not limited to, online newspapers, magazines or periodicals in HTML available on the Internet.

In a further exemplary embodiment, stop 60 of accessing content includes locating and acquiring an information stream from an audio-visual program presented in human accessible form. This may include accessing a radio broadcast and, using well known speech recognition algorithms, converting the spoken content of the radio broadcast into an electronic, text format suitable for manipulation by pattern recognition algorithm of the sort previously detailed. This may also include accessing a television transmission and, using well known speech recognition algorithms, converting the spoken content of the acquired television program into an electronic, text format. This may also include accessing a television transmission and acquiring the closed caption, text version of audio speech associated with many television programs. The technology to acquire and manipulate television closed captioning text is well known and described in, for instance, U.S. Pat. No. 6,075,550 granted to Lapierre on Jun. 13, 2000, titled "Censoring assembly adapted for use with closed caption television", the contents of which are hereby incorporated by reference. Using such technology, an information stream suitable for use by the automated response engine of this invention may be acquired.

The content download by one or more of these means may be content that matches one or more search criteria such as, but not limited to, program title, program time, program channel or one or more key words.

The steps of searching the downloaded content 64, determining if there is a keyword match 66, if a key word is found, unpacking the containing content 68, determining if a response pattern matches 70, and if a response pattern is found, updating a statement response database 72 result in converting the downloaded publication content into one or more entries suitable for use in a statement-response database of the type described previously. Once a suitable entry is found, it may be appropriately stored in the statement-response database.

Figure 4:
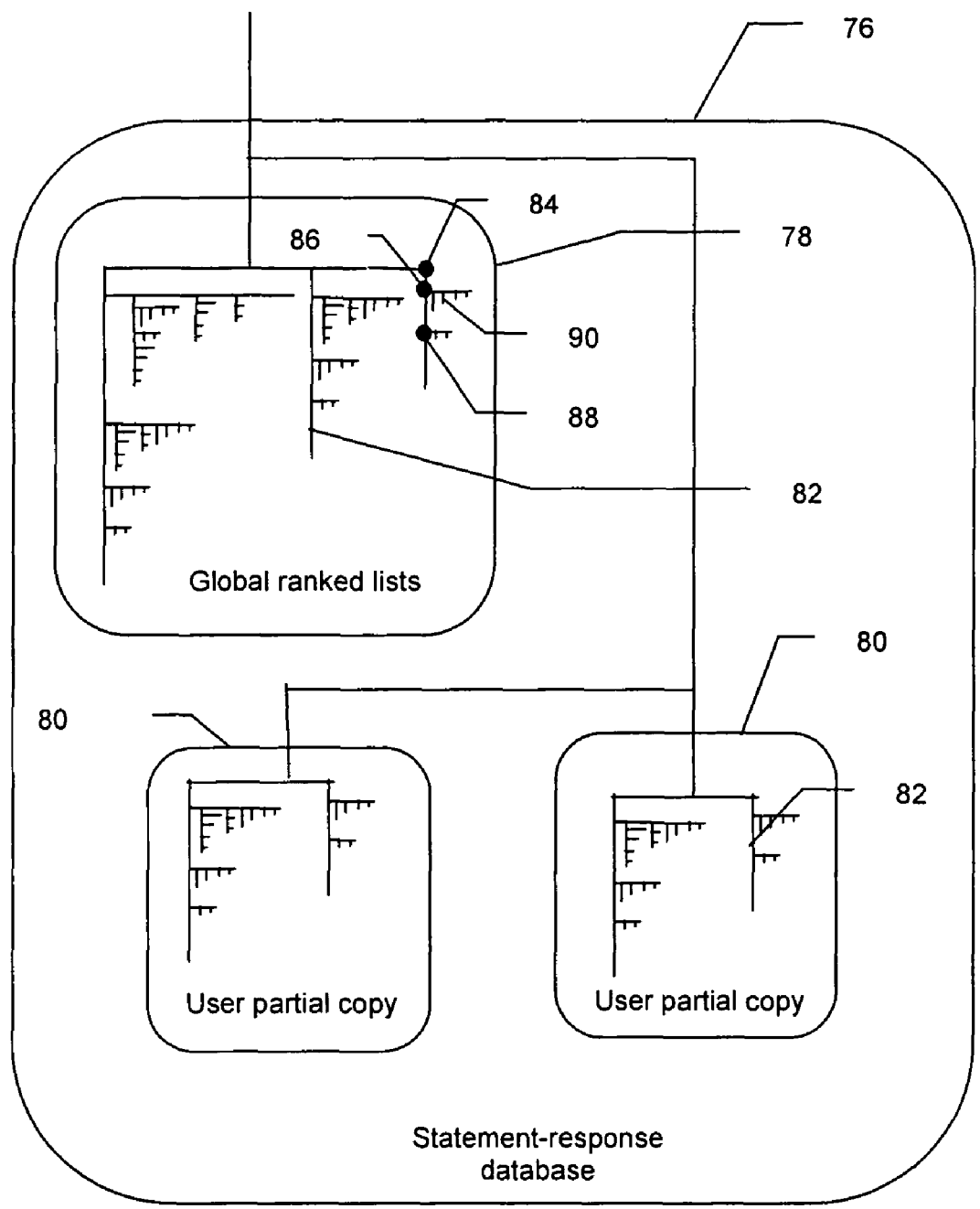
FIG. 4 shows various components of an exemplary statement-response database in accordance with the present invention.

FIG. 4 shows various components of an exemplary statement-response database that can be utilized to implement the inventive concepts described herein. The statement-response database 76 comprises a set of global ranked lists 78 and one or more user partial copies 80. The global ranked lists 78 includes a tree-like structure 82 containing one or more ranked lists of possible responses to a given statement, as do the user partial copies 80. The tree-like structure 82 includes node-words 84, statement nodes 86 and 88 and responses 90.

Each node-word 84 may be a subject word such as, but not limited to, a noun, adjective or a verb. The statement nodes 86 and 88 may be a phrase or sentence associated with the node word 84. For instance, node word 84 may be the word "favorite". The statement nodes 86 and 88 may be the phrase or sentences, "What is your favorite food?" and "What is your favorite movie?". Responses 90 associated with statement node 86 may then include words, phrases or sentences useful as responses to the statement, such as "hamburgers", "pizza", "anything sweet", "nothing with anchovies". The responses may then be ranked by suitable criteria ranging from, for example, the time the response was learnt, sophistication of response or length of response.

The user partial copies 80 may include ranked copies of responses encountered, used or otherwise related to the current or prior conversations with a specific user. The user copies may include weighting factors, indicating degree of match or mismatch between a given statement-response and a same or similar statement response stored in the global database.

The partial list may be indicative of a user's mastery of a topic or subject that the automated response engine has previously learnt. For instance, in one embodiment, the user copy starts as a copy of the global subject database list, with all the answers blank. As the user correctly gives the correct answer to the question, that answer is filled in and time stamped. Note may also be taken of wrong answers by starting to fill in the test set section of the user database copy. Note may also be taken of whether the correct answer was given with or without prompting. A user's knowledge of the subject can then be represented by the sum of the categories in the user copy of the database having answers. In summing the categories, each element may be weighted by one or more of rank, time stamp, number of wrong answers given and whether the right answer was given with or without prompting.

For instance, a user's knowledge may be represented mathematically as:

$$\text{Knowledge} = \Sigma^n_1 (R_i * T_i * K_i)$$

where $R_i$ is related to the rank of the ith category, (Zipf frequency ranking is one possibility), and where $T_i$ is the time since the ith element was learnt or last correctly identified (this may be normalized so that, for instance, today is 1 and a year ago is 0.5. This may also be interpolated linearly or non-linearly, or this may also be represented as some sort of half life, with knowledge having for instance, a half life of say 3 months—i.e. start at 1 and successively half this factor for every three months elapsed since learning last occurred or was last reset) and $K_i$ represents the manner in which the correct answer was last identified. This may for instance be 1 if done unprompted and 0.5 if prompted.

The whole function may be normalized against total knowledge base of the global data base, or some required fraction of it which may be appropriate based on age or personal function requirements.

Figure 5:
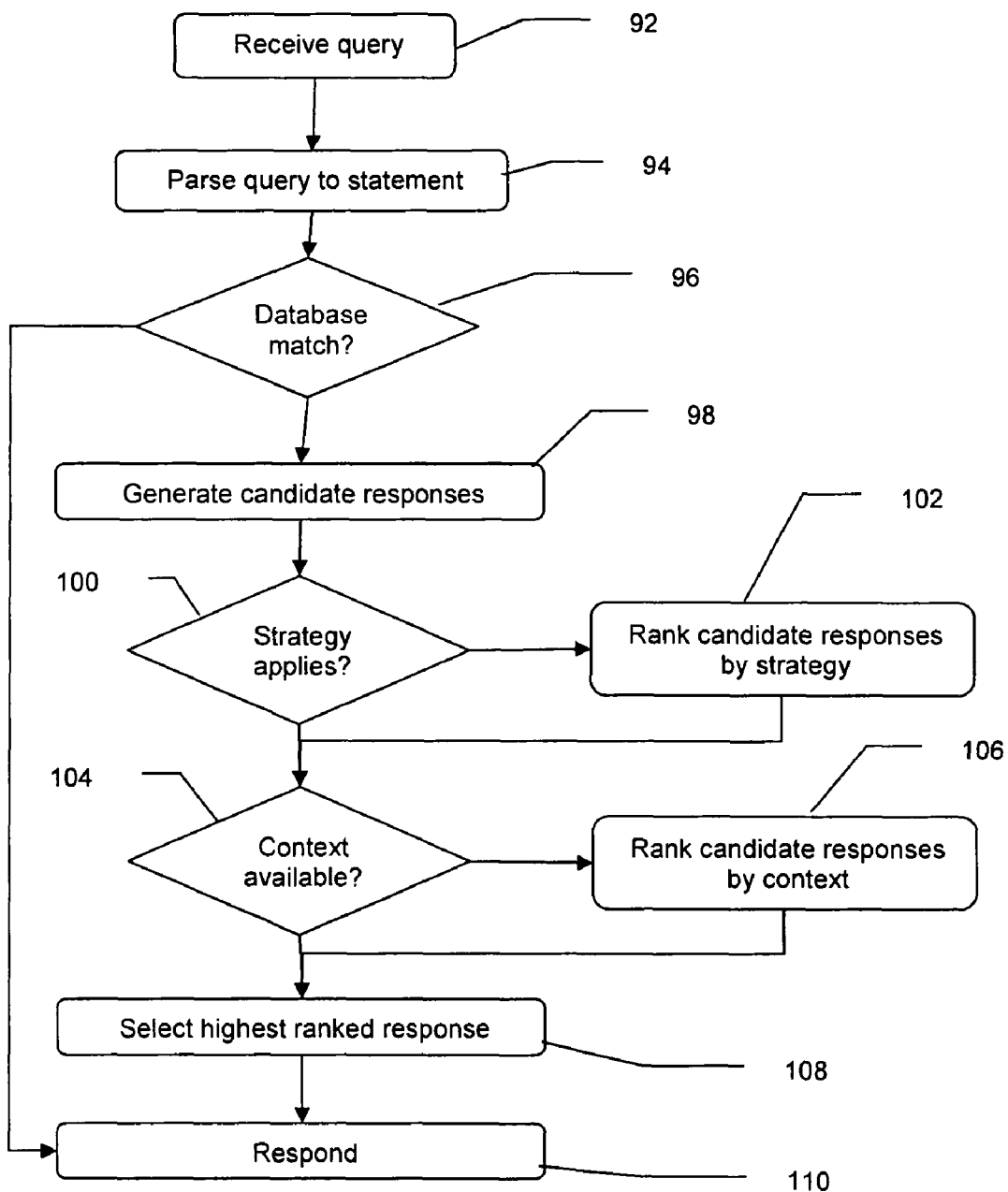
FIG. 5 shows various steps of an autonomous response engine generating a natural language response to a natural language query in accordance with the present invention.

FIG. 5 shows various steps of an autonomous response engine generating a natural language response to a natural language query that can be utilized to implement the inventive concepts described herein. Generating the response includes receiving a query 92, parsing the query into a statement 94, searching a statement-response database for a match 96, if a match is found, generating one or more candidate responses 98, checking if a conversational strategy applies 100, if a strategy applies ranking the candidate responses according to the requirements of the strategy 102, checking to see if a context is available 104, is a context is available, further ranking the candidate responses by the criteria of the context 106, then selecting a now highest ranking of the candidate responses 108 and responding to the query using the now highest ranking of the candidate responses 110.

The step of receiving a query 92, includes receiving said query as an electronic character stream. The character stream may be in the form of, but is not limited to, the well known ASCII form. In a further embodiment of the invention, the step of receiving a query 92 may further include receiving an input in the form of an audio signal corresponding to a human voice representation of the query and then converting that audio input audio signal into an electronic character stream representative of the query. This audio to text input may for instance be accomplished using well known, commercially available speech-to-text software modules such as, but not limited to Nuance Inc. of Menlo Park, Calif., 's Nuance 8.0 and Nuance 8.0 NVP Edition, both of which provide accurate, scalable and reliable speech recognition software. Such software typically requires training to adapt to the users voice. However, once trained, such modules can convert a person's spoken words to electronic text with a high degree of accuracy.

Parsing the query into a statement 94 may be done by a number of computer techniques, including using parsing engines such as, but not limited to, those described in U.S. Pat. No. 5,434,777 to Luciw entitled "Method and apparatus for processing natural language", the contents of which are hereby incorporated by reference. Such parsing may also be done, in part or completely, by using tables of word types sorted by frequency. The parsing may include spelling and grammar correction using well known methodology as described in, for instance, U.S. Pat. No. 6,085,206 to Domini et al. entitled "Method and system for verifying accuracy of spelling and grammatical composition of a document", the contents of which are hereby incorporated by reference.

Once parsed into a suitable statement, the response engine searches the statement-response database for a match in step 96. If a match or close match is found, the system uses the ranked list of stored response to generate a list of appropriate candidate responses in step 98. Having found a list of candidate responses, the system chooses a best response from the list. This may be done by checking if a conversational strategy applies 100. If there is an appropriate conversational strategy being used, it may be used to re-rank the list of candidate responses in step 102. For instance, if an aspect of the conversation strategy includes matching the sophistication of the response to the sophistication of the query, the candidate responses may be re-ranked using an appropriate measure of sophistication such as, but not limited to, the sum, average or mean of the word frequency ranking of each of the words in the response, or the highest ranking word or some combination thereof.

The response engine may also determine if an appropriate context element is available in the context database in step 104. If a suitable context element is available, this may be taken and used to further rank the candidate responses.

In steps 108 and 110 the query engine responds, using the now highest ranked response. The chosen response may be transformed into an appropriate natural language word, phrase, sentence or sentence and output as an electronic character stream. In a further embodiment of the invention, the electronic character stream may be converted into a synthetic speech signal corresponding to an audible version of said best response, by using well known text-to-speech technology.

In a further embodiment of the invention, the users responses may be evaluated against for instance, norms related to the user age, gender, nationality or factor related to expected skill level within a task such as, but not limited to, facility with a particular language. This analysis may include a variety of elements such as, but not limited to, the content of the answer, representing the users knowledge, and the structure or grammar of the answer.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. An autonomous response method, comprising:
   automatically updating a context database, said context database containing one or more context elements selected from the group consisting of a score in a sporting contest, a value of a market index, a value of a commodity, a result of a poll and a result of a survey, or some combination thereof;
   using one or more of said context elements to generate a learned mood number ($M_l$);
   automatically updating a statement-response database, said updating including associating and storing said learned mood number with said response;
   receiving a natural language query;
   automatically generating at least two possible responses to said natural language query;
   automatically obtaining current values of said context elements corresponding to those used in generating said learned mood number;
   using said current values of said context elements to generate a current mood number ($M_c$);
   automatically weighting said possible responses using said learned mood value stored with said response and said current mood value using the formula:
   weight=$1/(1+C|(M_c)-(M_l)|)$, where C is a constant related to a suitability of said possible response and | | indicates the absolute difference between the current and learned mood values; and,
   automatically using a processor selecting said lowest weighted response to generate a natural language response to said natural language query.

2. The method of claim 1 wherein said autonomously updating a statement-response database further comprises:
   automatically downloading, from an online publication formatted to be in human readable form, content that matches at least one search criteria;
   converting said downloaded content into at least one entry suitable for use in said statement-response database; and,
   storing said at least one entry in said statement-response database.

3. The method of claim 2 wherein said autonomously updating a statement-response database further comprises:
   autonomously acquiring an information stream from an audio-visual program presented in human accessible form, wherein said program matches at least one program search criteria;
   transforming said information stream into at least one entry suitable for use in said statement-response database; and,
   storing said at least one entry in said statement-response database.

4. The method of claim 2 wherein said statement-response database includes at least one ranked-list of response entries appropriate to a statement.

5. The method of claim 2 wherein said statement-response database includes at least one ranked-list of response entries related to prior conversations with a specific user.

6. The method of claim 2 wherein said autonomously generating a response to a natural language query further comprises: receiving said query as an electronic character stream; parsing said query into a statement; generating a plurality of candidate responses appropriate to said statement by searching said statement-response database; choosing a best response from said candidate responses using said conversation strategy and said at least one context element taken from said context database; outputting said best response as an electronic character stream.

7. The method of claim 2 wherein said autonomously generating a response to a natural language query further comprises: receiving an input audio signal corresponding to a human voice representation of said query; converting said input audio signal into a query represented by an electronic character stream; parsing said query into a statement; generating a plurality of candidate responses appropriate to said statement by searching said statement-response database; choosing a best response from said candidate responses using said conversation strategy and said at least one context element taken from said context database; generating an electronic character stream representing a natural language version of said best response; and, converting said electronic character stream into a synthetic speech signal corresponding to an audible version of said best response.

8. The method of claim 2 wherein said conversation strategy comprises: negotiating an identity of a current enquirer; negotiating a meaning of a current query; and, negotiating a conclusion to a current conversation.

9. The method of claim 2 wherein said conversation strategy comprises: scoring said query by assessing the level of language use in said query input to provide a metric of query sophistication; generating at least two candidate responses appropriate to said query; scoring said at least two candidate responses by assessing the level of language use in said candidate responses to provide a metric of response sophistication for each candidate response; choosing said candidate response having said metric of response sophistication that most closely matches said metric of query sophistication.

10. An autonomous response apparatus, comprising: a processor implementing the steps of:
automatically updating a context database, said context database containing one or more context elements selected from the group consisting of a score in a sporting contest, a value of a market index, a value of a commodity, a result of a poll and a result of a survey, or some combination thereof;
using one or more of said context elements to generate a learned mood number ($M_l$);
automatically updating a statement-response database, said updating including associating and storing said learned mood number with said response;
receiving a natural language query;
automatically generating at least two possible responses to said natural language query;
automatically obtaining current values of said context elements corresponding to those used in generating said learned mood number;
using said current values of said context elements to generate a current mood number ($M_c$);
automatically weighting said possible responses using said learned mood value stored with said response and said current mood value using the formula:
weight=$1/(1+C|(M_c)-(M_l)|)$, where C is a constant related to a suitability of said possible response and | | indicates the absolute difference between the current and learned mood values; and,
automatically selecting said lowest weighted response to generate a natural language response to said natural language query.

11. The apparatus of claim 10 wherein said processor is further capable of autonomously updating, comprising: autonomously acquiring an information stream from an audio-visual program presented in human accessible form, wherein said program matches at least one program search criteria; transforming said information stream into at least one entry suitable for use in said statement-response database; and, storing said at least one entry in said statement-response database.

12. The apparatus of claim 10 wherein said statement-response database includes at least one ranked-list of response entries appropriate to a statement.

13. The apparatus of claim 10 wherein said processor is further capable of generating a response to a natural language query comprising: receiving said query as an electronic character stream; parsing said query into a statement; generating a plurality of candidate responses appropriate to said statement by searching said statement-response database; choosing a best response from said candidate responses using said conversation strategy and said at least one context element taken from said context database; outputting said best response as an electronic character stream.

14. The apparatus of claim 10 wherein said processor is further capable of generating a response to a natural language query further comprising: receiving an input audio signal corresponding to a human voice representation of said query; converting said input audio signal into a query represented by an electronic character stream; parsing said query into a statement; generating a plurality of candidate responses appropriate to said statement by searching said statement-response database; choosing a best response from said candidate responses using said conversation strategy and said at least one context element taken from said context database; generating an electronic character stream representing a natural language version of said best response; and, converting said electronic character stream into a synthetic speech signal corresponding to an audible version of said best response.

15. The apparatus of claim 10 wherein said processor is further capable of a conversation strategy comprising: negotiating an identity of a current enquirer; negotiating a meaning of a current query; and, negotiating a conclusion to a current conversation.

16. The apparatus of claim 10 wherein said processor is further capable of a conversation strategy comprising: scoring said query by assessing the level of language use in said query input to provide a metric of query sophistication; generating at least two candidate responses appropriate to said query; scoring said at least two candidate responses by assessing the level of language use in said candidate responses to provide a metric of response sophistication for each candidate response; choosing said candidate response having said metric of repose sophistication that most closely matches said metric of query sophistication.

* * * * *